June 2, 1953  A. R. DE BURGH  2,640,580
CONVEYER SYSTEM
Filed Aug. 26, 1948  3 Sheets-Sheet 1
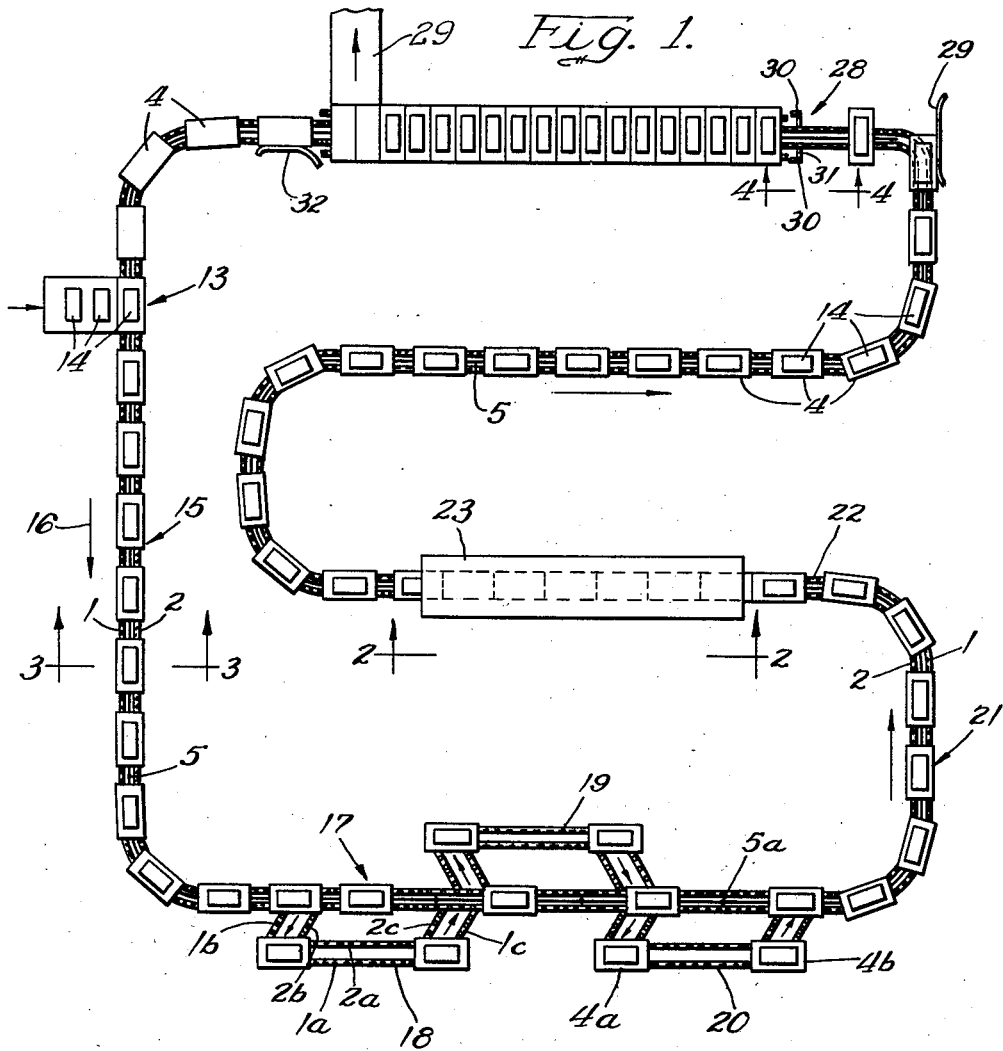
Inventor:
Albert Raymond DeBurgh
By Soans, Pond & Anderson
Attys.

June 2, 1953 A. R. DE BURGH 2,640,580
CONVEYER SYSTEM
Filed Aug. 26, 1948 3 Sheets-Sheet 2
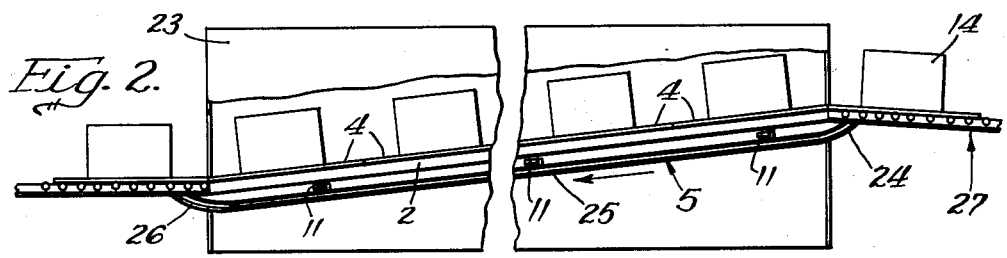
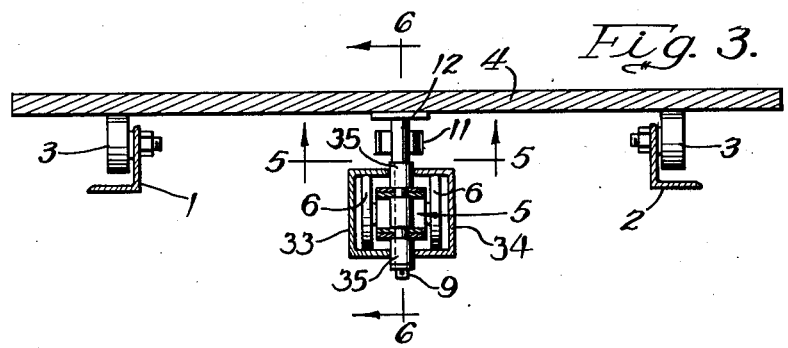
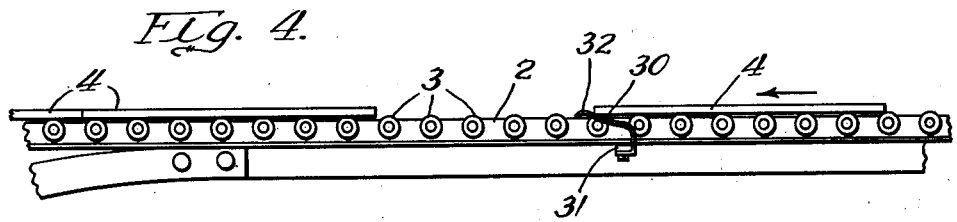
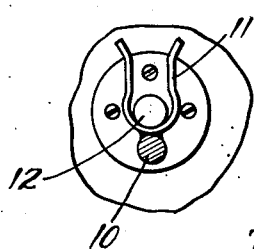
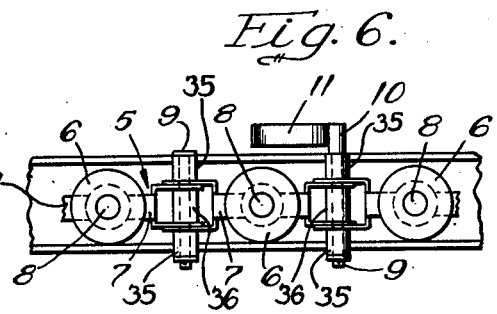
Inventor:
Albert Raymond DeBurgh
By Soans, Pond & Anderson
Attys.

June 2, 1953     A. R. DE BURGH     2,640,580
CONVEYER SYSTEM
Filed Aug. 26, 1948     3 Sheets-Sheet 3
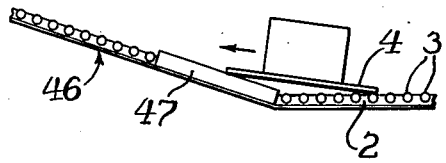
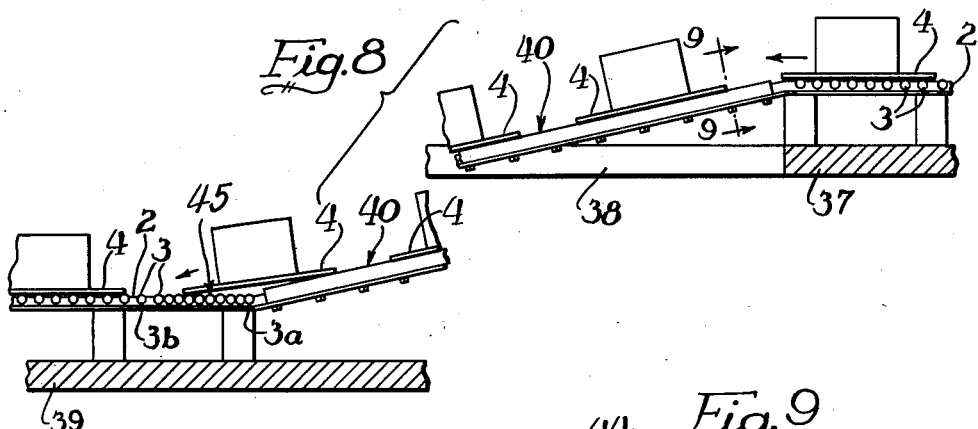
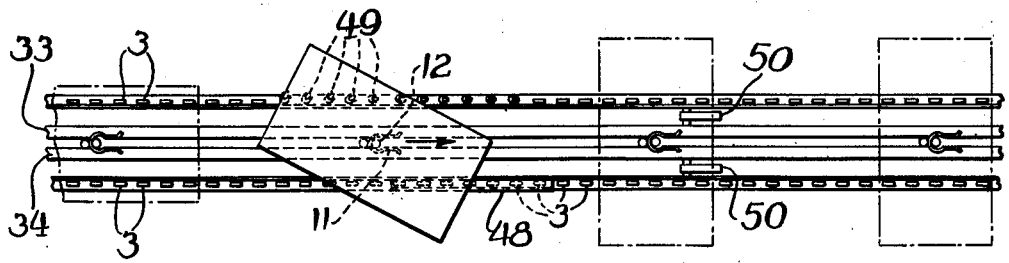
Inventor:
Albert Raymond DeBurgh
By Soans, Pond & Anderson
Attys.

Patented June 2, 1953

2,640,580

UNITED STATES PATENT OFFICE 2,640,580

CONVEYER SYSTEM

Albert Raymond De Burgh, Redondo Beach, Calif.

Application August 26, 1948, Serial No. 46,252

7 Claims. (Cl. 198—33)

This invention relates to an improvement in conveyor systems, and more particularly to conveyor systems such as used in manufacturing establishments for conducting work through various work stations in which various operations are successively performed. The operations may be assembling, finishing, or other operations.

Conveyor systems are now quite commonly employed in manufacturing establishments for the above-indicated purposes, but space requirements and production volume requirements to justify conveying systems heretofore available have made such systems practicable mainly for manufacturing establishments which have a large volume of production and which have a large amount of floor space for installation of the conveyor system. Smaller plants, that is to say, manufacturing establishments which have a relatively small amount of floor space, and those which have a relatively small volume of production have heretofore not found it practicable to employ full and continuous conveyor systems to a degree whereby the normal benefits of a conveyor system can be obtained.

The principal objects of the present invention are to provide a conveyor system which will be adapted to installation in manufacturing and other establishments which have limited floor space in which to operate; to provide a conveyor system which will also facilitate the carrying on of certain operations which require more time than is normally available in a single station when the conveyor is propelled either continuously or intermittently at a normal rate, that is to say, to facilitate carrying out of longtime operations without interfering with the normal travel of the conveyors; to provide a "close pack" conveyor arrangement in connection with the normal conveyor, which will permit employment of a conveyor of reduced length, smaller dryer structures and smaller, more economical heating provisions for operating the dryers; to provide an improved conveyor chain construction which can readily travel through any practical tortuous path of travel embodying vertical as well as horizontal changes in the path of travel; and to provide a generally improved conveyor system for the purpose indicated.

Other objects and advantages of the invention will be understood by reference to the following specification and accompanying drawings (3 sheets) wherein there is illustrated a conveyor system embodying a selected form of the invention.

In the drawings:

Fig. 1 is a more or less diagrammatic plan of a conveyor system embodying a selected form of the invention, Figs. 2, 3 and 4 are sections respectively on the lines 2—2, 3—3 and 4—4 of Fig. 1, Fig. 5 is a section on the line 5—5 of Fig. 3, Fig. 6 is a section on the line 6—6 of Fig. 3, Fig. 7 is a more or less schematic side elevation illustrating an arrangement employed for facilitating a change in the direction of travel of a pallet or other article on the conveyor from a more or less horizontal path to a vertically upwardly inclined path, Fig. 8 is a more or less schematic side elevational view of an arrangement for conveying articles from one floor of a building to a lower floor thereof, or downwardly between two widely spaced vertical elevations, Fig. 9 is a cross-section on the line 9—9 of Fig. 8; and Fig. 10 is a more or less schematic plan of an arrangement for rotating the conveyed work through an angle of 90° while it continues its normal path of travel.

The conveyor herein illustrated is of a more or less common form embodying spaced parallel angle iron frame elements 1 and 2 (Fig. 3) which have secured thereto a series of rollers 3. The rollers 3 are freely rotatable on suitable studs bolted or otherwise secured to the upstanding flanges of said frame members, and they are spaced apart a distance which will insure the engagement of a suitable number thereof by pallets or work-supporting platforms such as represented at 4.

The pallets 4 are adapted to be propelled along the length of the conveyor system by means of an endles chain or belt conveyor 5 (Figs. 3 and 6) which consists of a series of rollers 6 secured together by suitable chain links 7. The rollers 6 are rotatable on axially horizontal pivot pins 8 carried by the adjacent ends of a pair of said links 7, such adjacent ends being also pivotally interconnected for movement about a horizontal axis by such horizontal pivot pin. The opposite ends of the links 7 are pivotally interconnected to the adjacent ends of other links 7 by means of axially vertical pivot pins 9 so that the conveyor is capable of flexing both horizontally and vertically. This chain construction eliminates any need for sprockets or extra rollers or guides for turns in either horizontal or vertical direction. Also, it will be observed that the chain structure is effectively housed by its guiding and supporting channels 33 and 34. The horizontal flanges of said channels act through the rollers 6 of the conveyor chain to guide the same in respect of vertical movement, and the adjacent vertical edges of said horizontal flanges act on suitable collars or roller sleeves 35 on the vertical pins 9 of the chain to guide the chain in respect of horizontal movement. The channels 34 and 35 incidentally form a housing or enclosure for the chain, and constitute a desirable safety factor since the moving chain structure is accessible through only the narrow top and bottom slots between the said channels.

Certain of the pivot pins 9 are extended upwardly as indicated at 10 and support a U-shaped clip 11 which is adapted to receive between its arms a pin 12 which depends from the bottom of each pallet 4. By the engagement between the conveyor clip 11 and the depending pin 12 of the pallet, the conveyor chain 5 is enabled to propel the pallet along the conveyor and to cause the pallet to follow the course of the conveying system. Also, it will be evident that the pallets are individually rotatable about the axes of their depending pusher pins 12 so that the work carried by the pallets may be turned to the most advantageous position for the operation to be performed thereon.

To further facilitate turning of the pallets about the vertical axes of their pusher pins, suitable turntable stations may be provided. One form of suitable turntable station is shown in my Patent 2,317,675, and it should be understood that turntable stations of any suitable kind may be incorporated in the conveyor system at any desired points. Inasmuch as the present invention is not concerned with the turntable construction, the same is not herein shown.

The conveyor chain 5 is suitably guided where needed in respect of changes in both the vertical and horizontal paths of travel of the chain.

Driving power may be applied to the chain through one or more sprockets which, if desired, may also constitute guiding sprockets. Preferably, a caterpillar type of drive is employed, i. e., a drive consisting of a short belt-like driver (not illustrated) which has simultaneous driving engagement with a plurality of the vertical pivot pins 9 through the end collars 35 of central collars 36 thereon.

Referring to Fig. 1 of the drawing, it may be assumed that the conveyor structure is equipped with pallets 4 to provide work supports normally spaced a predetermined distance along the system for its entire length. Such conveyor propelled pallets may be loaded at a station represented at 13, an article on which work is to be performed being represented at 14. Along the reach 15 of the conveyor which is assumed to be travelling in the direction indicated by the arrow 16, any desired work stations may be located. In the event that certain operations must be performed that require greater time than is allowed by either the continuous or intermittent motion of the conveyor within the length of any work station, a side-tracking or shunting arrangement may be employed for temporarily removing from the main conveyor a pallet with the work thereon, while at the same time delivering to the emptied station a pallet with the work thereon in which the long-time operation has already been performed. In that manner, the conveyor will be kept fully charged with work pieces being propelled through the various succeeding stations.

In the reach 17 of the conveyor 3, shunt stations 18, 19, and 20 are indicated, the stations 18 and 20 being shown offset on one side of the conveyor, and the station 19 offset on the other side. Each of these shunt stations includes conveying track sections 1a and 2a arranged parallel with the structure of the conveyor reach 17. These parallel shunt sections are connected by similar short track sections 1b and 2b, and 1c and 2c with the main track sections 1 and 2 so that a work-carrying pallet may be readily shifted from the main conveyor to the shunt or side track. To avoid any tendency for a pallet to automatically leave its normal course and to enter the shunt, the short connecting conveyor sections are preferably arranged at a rearward angle with respect to the direction of travel of the conveyor so that it is necessary for a workman to initially advance the pallet a short distance so as to disengage its pusher pin 12 from the clip 11 and to then pull the pallet sideways and somewhat rearwardly to the offset position of the shunt conveyor section 18. On that section the pallet will remain in whatever position the workman leaves it since there is provided no means for propelling the pallet along that section. This section may advantageously embody one of the turntable conveyor sections such as above referred to whereby the pallet and work thereon may be turned to the most advantageous position for the operations to be performed at that station.

Assuming that the operations to be performed on the work at the shunt station 18 require three times as much time as is required for performing the work at other stations, it would be advantageous to provide three shunt stations such as represented at 18, 19, and 20 whereby three workmen may work on three separate units by performing the same type of work. Three such stations serve, of course, to enable the three workers at those stations to maintain a continuous flow of work-filled pallets to other work stations beyond the three shunt stations. For example, assuming that a worker at station 20 has withdrawn pallet 4a from the position 5a of the conveyor, that emptied position would be immediately filled by delivering thereto the work pallet 4b carrying work on which the longer time operation has been completed.

When the worker operating on the loaded pallet 4a is about one-third through his operation, the worker at station 19 should be ready to withdraw from the main conveyor a pallet carrying an uncompleted article and to fill the conveyor space thus emptied with a pallet containing a completed article. Similarly, when the worker at station 20 is about two-thirds through with his operation, the worker at station 18 should be ready to withdraw an unfinished piece of work from the main conveyor and to fill the space thus emptied with a piece of work finished by him. Hence, the three workers at stations 18, 19, and 20 are able to maintain the conveyor loaded with work to be propelled through various stations subsequent to the last of the long-time operating stations 18, 19, and 20.

These shunt stations also offer excellent opportunities for the training of inexperienced workers who, because of their inexperience, require more than normal time for the performance of required operations. Also, these shunt stations offer good opportunities for careful inspection of the work.

A "shunt station" as a training station for a new employee is a very valuable feature. The "new worker" actually works on conveyorized production, and is allowed any amount of time for the operation without interfering with regular production. This is accomplished by pulling a pallet, carrying new work from the regular production line to the shunt station, and replacing in the space vacated by said pallet, a pallet carrying the completed work of the new worker. This operates to provide a constant supply of work to succeeding stations regardless of time expended in the completion of the work at the training shunt station. Such a training shunt station would be an auxiliary station to the regular station so that production would be maintained by a trained operator at the regular stations.

A further valuable advantage of the shunt station is that it may avoid costly losses of labor time on a progressive timed conveyor where a difficult operation is performed, or where unexpected delays in work may occur, and/or when work is not completed at a work station within the time allowed, thereby preventing the performance of additional work at one or more subsequent stations.

For example, a shunt station pallet 4b may mount a pallet loaded with the work on which the operations of the station have been completed. The operator, working at a station immediately preceding the shunt station 20, if unable to perform the work at such station for any reason, may shove the pallet carrying his uncompleted work to the location of pallet 4a, station 20, and pull pallet 4b, mounting the completed work onto the conveyor line thereby providing work for subsequent stations.

The location of a pallet at 4a would indicate to a supervisor or repairman that such a pallet-carried work required completion, or a part replacement, etc. Further means could be provided whereby the movement of such a pallet into the location 4a would automatically turn on a light, sound a signal, raise a flag, or otherwise notify the supervisor or repairman that work was required at that shunt station. When the work on pallet 4a is completed, said pallet would be moved to position 4b by the supervisor or repairman, where it is available if further difficulty arises.

Automatic counting means could be incorporated in the shunt station to tally the number of times operators had to resort to the use of the shunt station, indicating, if an abnormal number of times, that either time allotted for the work is insufficient or that the operator is not suited to the work, or too many defective parts are included, or that previous work has not been properly executed.

A "shunt station" is very valuable as it will permit the use of progressive type, timed conveyors for assembly and other uses, where they are not practical without the means provided by this invention.

Various work stations may be located along the reach 21 of the conveyor which may be made as long as necessary to accommodate the desired stations. In order to conserve space, the conveyor may be doubled back on itself to provide a reach 22 along which one or more work stations may be located.

In this instance, the reach 22 is shown as travelling through an oven diagrammatically represented at 23. In order to keep the work in the oven for the required length of time while at the same time permitting the use of a relatively short oven length, provision is made for close packing the pallets during their travel through the oven. By close packing, I mean assembling of the pallets in end-to-end contact so as to eliminate waste space between the same.

By close packing the pallets as shown on the conveyor reach 22 in Fig. 1, it is possible, in the proportions shown in the drawing, to simultaneously house six complete pallets within the oven as compared with about 4½ pallets in their normally spaced relation on the conveyor. Hence, there is a gain of nearly ⅓ in the time of oven treatment given to the work on each pallet when the pallets are close packed. This is accomplished in such a manner that the conveyor section emerging from the oven will, nevertheless, be fully loaded with work-carrying pallets properly spaced.

Close packing of the conveyors is accomplished by suitably guiding the propelling conveyor 5 downwardly from its normal plane of travel between the roller-carrying tracks 1 and 2 as indicated at 24 in Fig. 2. As soon as the propelling conveyor 5 has been lowered to an extent sufficient to withdraw its pallet pushing clips 11 from the pallet pins 12, the propelling conveyor is suitably guided through a path of travel which is parallel to the roller-carrying tracks. In Fig. 2, the reach 25 of the propelling conveyor 5 is illustrated as being lowered from its normal propelling relationship to the conveyor tracks, the clips 11 being disengaged from the pallet pins 12. Hence, the reach 25 of the conveyor travels idly under the pallets on the overlying track sections. In order to re-engage the successive clips 11 with pallet pins, the conveyor is suitably guided upwardly as indicated at 26 into normal operating relationship to the pallets.

In Fig. 2, the pallets 4 which are located within the oven 23 are shown in end-to-end engagement. Movement of the pallets through the oven is effected step by step as an incident to the delivery of each successive pallet into the oven, the incoming pallet serving to engage and advance the pallet previously delivered into the oven thereby causing the pallet at the discharge end of the oven to be discharged therefrom.

The roller or wheel supports for the pallets are preferably so constructed that they offer a minimum of resistance to the travel of the pallets, thereby to avoid excessive power requirements for operation of the system. The ease of movement may be such that the delivery of one pallet into the oven would have a tendency to impart such momentum to the entire series of pallets within the oven as to cause the latter to roll a distance which is greater than the positive feed imparted by the incoming pallet. A suitable friction device may be employed to prevent such free travel. At the same time it is important to avoid the application of excessive resistance to advancement of the pallets through the oven since such excessive resistance would tend to cause irregular or jerky operation of the conveyor incident to the reaction load imparted thereto each time that a pallet is delivered into the oven, and the oven-contained series advanced one step. Furthermore, excessive resistance to advancement of the pallets through the oven would necessitate extra heavy construction of the propelling conveyor 5 and of the inter-engaging clip-carrying posts 10 and pallet posts 12.

To avoid excessive power requirements and to avoid the indicated strains on the conveyor structure, a portion of the conveyor system leading up to the entrance end of the oven may be inclined upwardly as represented at 27 (Fig. 2). The rise of about 12 inches in a length of six feet or more can be effected without imparting a severe extra load to the propelling conveyor. The conveyor tracks 1 and 2 within the length of the oven would then be inclined downwardly as shown in Fig. 2 to restore the conveyor to its normal elevation.

The pallets 4 within the oven 23 would go down the inclined tracks with the aid of gravity so that excessive strain on the pusher pins 10 and 12 and on the conveyor chain would be avoided. The downward inclination is to be limited, or pallet retarding means of any suitable character is provided, to the end that the loaded pallets travelling down an inclined conveyor portion will not move freely down the incline but will require positive propelling force from the incoming pallet and its propelling means. However, the gravitation effect of the downward incline is such that inertia of the standing pallets in the oven is not so great that shocks would be imparted to the propelling conveyor incident to the engagement of an incoming pallet with the immediately preceding pallet in the oven. By varying the inclination of the track sections within the oven, the resistance to movement of the pallets through the oven may, of course, be varied. Any suitable vertically adjustable supporting structure may be provided for facilitating such adjustment of the angle of the inclined parts of the structure, or the angle may be varied by insertion or removal of supporting blocks or shims under the supporting structure at the high point of the conveyor.

From the foregoing it will be understood that the work-carrying pallets are delivered one by one into the oven 23, and withdrawn therefrom at the same rate that they are delivered thereinto while at the same time permitting each pallet with its load to remain in the oven for a time period which is greater than the time required for the travel of each work-propelling post 10 of the propelling conveyor through the length of the oven. This delay in the travel of the pallets is, of course, attained by elimination of the space between the pallets to effect close packing thereof within the length of the oven.

Upon emergence from the oven, the conveyor may carry the work pallets through various other stations such as inspection, marking, labelling, wrapping, and other stations which may be desired, and to an unloading station.

Another form of close packing which may be employed in connection with the passage of the loaded pallets through an oven or through other stations, is, for convenience, represented on the reach 28 of the conveyor which leads to the unloading platform represented at 29 (Fig. 1). As there shown, the pallets are close packed side to side instead of end to end as shown on the reach 22, thereby enabling a still greater number of loaded pallets to be accommodated within a given length. Hence, if side to side close packing is employed instead of end to end close packing, the travel time for each pallet through an oven or other zone would be increased to a still greater extent.

To effect side to side close packing, the pallets are turned 90 degrees with reference to the length of the conveyor. This is conveniently accomplished by suitable means, one of which is typified by a side guide 29 located at a relatively sharp 90 degree turn in the travel of the conveyor system. From an inspection of Fig. 1, it will be apparent that as a pallet 4 approaches the guide 29, a pallet side edge will come into engagement with the guide so as to prevent the pallet remaining in its normal length-wise relationship to the conveyor, or, in other words, so as to cause the pallet to be turned approximately 90 degrees about the axis of its depending pin 12. While the guide 29 may not unerringly turn the pallet 90 degrees to the extent indicated, correction may readily be accomplished by means of a pair of friction member 30—30 associated with the conveyor structure just beyond the pallet-turning corner.

The friction members 30—30 may be in the form of resilient spring clips such as shown more fully in Fig. 4, the clips being carried by suitable bracket arms 31 which extend laterally from the conveyor track frames 1 and 2. These spring clips are provided with end humps indicated at 32 which offer a more or less positive resistance to the travel of the indicated portion of the pallet.

In the event that the pallet is disposed at an angle other than an angle of 90 degrees to the length of the conveyor, the edge portion of the pallet, which first engages a clip 30, will, of course, be held until the other edge portion catches up and engages the other clip 30. Inasmuch as the pallet is positively propelled by the conveyor 5, the pallet will be forced over spring clips 32, the latter being preferably made so that they will yield and move downwardly under the loaded pallets, permitting the latter to ride freely over the clips with the said edge of the pallet in substantially perpendicular relationship to the length of the conveyor.

As each pallet is delivered into side to side engagement with the previously close packed pallets, the propelling chain 5 will, of course, be lowered out of engagement with the pallet as described above in connection with Fig. 2. Similarly, the propelling chain will be re-engaged with the pallets to withdraw the pallets one by one from the closed packed station.

To again restore the pallets to their normal lengthwise position on the conveyor, a guide member 32 (Fig. 1) may be provided for engaging one end portion of the pallet to cause it to turn about the axis of its depending post 12 as the pallet emerges from the close packed station of the conveyor. Thus the pallet is restored to normal position on the work conveyor with a space between pallets for convenience in loading and/or performing activities on such articles as may be mounted on the pallets.

The side to side close packed arrangement described in connection with the conveyor reach 28 may, of course, be employed for various purposes as already indicated, and the inclined conveyor arrangement illustrated in Fig. 2 may, of course, be employed in connection with the side to side close packed arrangement for controlling the travel of the pallets through the close packed station and for avoiding the excessive power requirements incident to the successive movements imparted to the close packed pallets by the entrance of one pallet into the close packed station.

In some instances it is necessary or desirable to transport the work carried by a conveying system from one floor of a building to a lower floor. In a conveying system such as herein disclosed wherein the work-carrying pallet is not secured to the propelling chain, downhill movement of the pallet involves the problem of preventing the pallet from running "wild" down the incline, i. e., from running away from or moving ahead of its driving engagement with the propelling chain.

In the arrangement shown in Fig. 8, the roller-carrying track elements 1 and 2 on an upper floor such as represented at 37 are extended downwardly at an angle through an opening or passageway 38 in said floor to a continuation of said tracks on a floor 39 below the floor 37.

To prevent the pallets 4 from running away from their driving connections with the propelling chains while going down the inclined conveyor section 40, friction means is provided for resisting the travel of the pallets with their respective loads. This friction means might consist of an arrangement for locking the rollers 3 on the inclined section of the tracks against or for retarded rotation, or in the removal of the rolls from said inclined sections so as to cause the pallets to travel over the inclined sections in direct frictional engagement with the upper edges of the tracks 1 and 2. In the event that the rolls are removed, it would be preferable that the track edges be slightly elevated above their normal planes, and also that they be widened so as to provide broader bearing surfaces for engagement with the undersides of the pallets to provide the desired amount of friction and to prevent excessive wear on the bottom faces of the pallets.

A preferred means for providing the required frictional resistance to travel of the pallets over the inclined conveyor sections is to cap the rollers in a suitable manner such as indicated in Fig. 9. As there shown, the rollers 3 are capped by means of a channel iron member 41 which has one leg 42 bolted as indicated at 43 to the horizontal flange of the track angle 2. The upper horizontal flange 44 of the channel iron cap provides a broad flat face for frictionally engaging the bottom faces of the pallets so that free movement of the pallets down the inclined track section is effectively resisted. The resistance thus provided is sufficient to prevent the pallet from running ahead and free of the post 10 and clip 11 of the propelling chain, but is not so great as to impose an objectionable strain on the conveyor. The amount of friction produced in the described manner may, of course, be controlled by selecting a cap having a flange 44 of such width as to provide the desired amount of friction. Also, the sliding faces of the flanges 42 may be suitably lubricated, if desired.

On the receiving end portion of the conveyor on the lower floor 39, it is advisable to provide means to prevent the leading edge of the pallet from coming into such radial or other locking engagement with the rolls 3 as would interfere with, if not prevent, the normal movement of the pallet forwardly on the conveyor. One such means may consist in the arrangement of some of the rolls 3 in such close proximity to each other that each roll prevents the pallet edge from coming into locking engagement with the next roll, this arrangement being represented at 45 in Fig. 8.

Another method of preventing the said locking engagement at the junction between the discharge end of the inclined track portion and the receiving end of a roller conveyor would be to continue the cap 40 over the rollers 3 of the receiving end portion of the conveyor system or to place a similar but shorter cap over the receiving end rolls. Endless belts supported by and extending around a pair of spaced rolls such as the rolls 3a and 3b may also be employed to prevent the indicated locking of the pallets against normal movement.

This problem of preventing stoppage of the article by engagement of a roller incident to a vertical turn in the path of travel of the article also occurs in connection with a change in direction from travel in a substantially horizontal plane to upwardly inclined travel as represented in Fig. 7. To prevent the leading edge of the pallet 4 from coming into such radial engagement with a roller as would stop travel of a pallet, the rollers may be placed closely together as shown at 45 in Fig. 8, or the rollers of the receiving portion of the inclined track section 46 may be capped by a length of channel iron as indicated at 47 in Fig. 7. The cap 47 may be similar to the retarding channel or cap 40 and secured in place in the same manner. Since friction is not desired at this point, the pallet-engaging surface of the member 45 should be smooth and, if not otherwise objectionable, well lubricated.

In some instances, it is desirable to rotate a pallet through an angle of 90 degrees either preliminary to close packing or for work purposes, while continuing the travel of the pallet in a given straight direction. An arrangement for accomplishing such rotation of the pallet is shown in Fig. 10. It consists in the provision of a cap 48 over a plurality of the rolls 3, the cap 48 being of the same general character as the cap 41 shown in Fig. 8. This cap 48 serves to provide frictional engagement against the underface of the pallet at one side thereof. On the opposite track a series of inverted axially vertical caster wheels 49 are substituted for a plurality of the normal rollers 3.

As indicated in Fig. 10, the pallet 4, upon coming into engagement with the friction member 48, will begin to rotate in a clockwise direction about the axis of its post 12 due to the frictional resistance provided by the cap 48 against one side of the pallet while the other side is permitted continued free forward movement. The provision of caster wheels 49 in place of the normal rollers 3 serves to facilitate the indicated turning of the pallet since the wheels may adjust themselves to permit the freest possible movement of the overlying portion of the pallet. There will, of course, be some sliding movement of the pallet over the caster wheels 49, but the friction resulting therefrom is far less than that provided by the fixed friction member 48 so that the arrangement is very effective for the indicated purpose.

To insure proper positioning of the pallet in its turned position, a pair of stationary spring clips 50 are provided for engaging the forward or leading edge of the turned pallet. These clips will serve to insure the desired transverse position of the leading edge of the pallet before the pallet can be propelled over these clips by the propelling chain. These clips 50 are similar to the guide member or clip 30 previously referred to.

The described features may, of course, be employed in various arrangements of the conveyor to provide such operating stations as may be needed in each installation. Various details of construction may be employed in connection with the features above described.

I claim:

1. In a conveying system, the combination of means for portably supporting a series of articles, a driven conveyor having article engaging means for propelling said series of articles in predetermined spaced relationship along said supporting means, means for effecting close packing of said articles along a predetermined section of said supporting means and resumption of the spaced travel of said articles beyond said section, said last-mentioned means comprising means for effecting disengagement of said article engaging means from said article at the receiving end of said close packed section, and means for effecting re-engagement of said article engaging means with an article at the discharge end of said close packed section.

2. In a conveying system, the combination of means for portably supporting a series of articles, a driven conveyor having article engaging means for propelling said series of articles in predetermined spaced relationship along said supporting means, means for effecting close packing of said articles along a predetermined section of said supporting means and resumption of the spaced travel of said articles beyond said section, said last-mentioned means comprising means for effecting disengagement of said article engaging means from said article at the receiving end of said close packed section, and means for effecting re-engagement of said article engaging means with an article at the discharge end of said close packed section, said supporting means in the close pack section being inclined downwardly to aid movement of the articles through said section.

3. In a conveying system, the combination of means for portably supporting a series of articles, a driven conveyor having article engaging means for propelling said series of articles in predetermined spaced relationship along said supporting means, means for effecting close packing of said articles along a predetermined section of said supporting means and resumption of the spaced travel of said articles beyond said section, said last-mentioned means comprising means for effecting disengagement of said article engaging means from said article at the receiving end of said close packed section, and means for effecting re-engagement of said article engaging means with an article at the discharge end of said close packed section, the article supporting means in said close packed section comprising spaced tracks which incline downwardly from the receiving end of the close packed section to the delivery end thereof, thereby aiding by gravity the movement of the close packed articles through said section as an incident to the delivery of successive articles into the receiving end of the section.

4. In a conveying system, the combination of means for portably supporting a series of articles, a driven conveyor having article engaging means for propelling said series of articles in predetermined spaced relationship along said supporting means, means for effecting close packing of said articles along a predetermined section of said supporting means and resumption of the spaced travel of said articles beyond said section, said last-mentioned means comprising means for effecting disengagement of said article engaging means from said article at the receiving end of said close packed section; and means for effecting re-engagement of said article engaging means with an article at the discharge end of said close packed section, the articles being normally disposed with their lengths extending in the direction of travel of the articles and their adjacent ends spaced from each other, and means for turning said articles in side to side relationship immediately before the articles enter said means for effecting close packing.

5. In a conveying system, the combination of means for portably supporting a series of articles, a driven conveyor having article engaging means for propelling said series of articles in predetermined spaced relationship along said supporting means, means for effecting close packing of said articles along a predetermined section of said supporting means and resumption of the spaced travel of said articles beyond said section, said last-mentioned means comprising means for effecting disengagement of said article engaging means from said article at the receiving end of said close packed section, and means for effecting re-engagement of said article engaging means with an article at the discharge end of said close packed section, the articles being normally disposed with their lengths extending in the direction of travel of the articles and their adjacent ends spaced from each other, and means for turning said articles in side to side relationship immediately before the articles enter said means for effecting close packing, said turning means comprising article engaging means for turning the articles through an arc of approximately 90 degrees.

6. In a conveying system, the combination of means for portably supporting a series of articles, a driven conveyor having article engaging means for propelling said series of articles in predetermined spaced relationship along said supporting means, means for effecting close packing of said articles along a predetermined section of said supporting means and resumption of the spaced travel of said articles beyond said section, said last-mentioned means comprising means for effecting disengagement of said article engaging means from said article at the receiving end of said close packed section, and means for effecting re-engagement of said article engaging means with an article at the discharge end of said close packed section, the articles being normally disposed with their lengths extending in the direction of travel of the articles and their adjacent ends spaced from each other, and close packing means comprising a relatively sharp turn in the travel of said propelling conveyor and in the length of said supporting means, and a relatively stationary guide adjacent said sharp turn for engaging an article carried around said sharp turn to prevent the article from maintaining its normal lengthwise position relative to the conveyor during the movement of the article through said sharp turn, said stationary guide being operative to effect turning of the article about said article engaging means as a fulcrum to an extent sufficient to cause the articles to be disposed in a transversely extending relationship to said propelling conveyor with their side edges in approximately parallel relation, said article propelling conveyor being thereafter disengaged from the articles to effect said side to side close packing thereof.

7. In a conveying system, the combination of means for portably supporting a series of articles, a driven conveyor having article engaging means for propelling said series of articles in predetermined spaced relationship along said supporting means, means for effecting close packing of said articles along a predetermined section of said supporting means and resumption of the spaced travel of said articles beyond said section, said last-mentioned means comprising means for effecting disengagement of said article engaging means from said article at the receiving end of said close packed section, and means for effecting re-engagement of said article engaging means with an article at the discharge end of said close packed section, the articles being normally disposed with their lengths extending in the direction of travel of the articles and their adjacent ends spaced from each other, and close packing means comprising a relatively sharp turn in the travel of said propelling conveyor and in the length of said supporting means, and a relatively stationary guide adjacent said sharp turn for engaging an article carried around said sharp turn to prevent the article from maintaining its normal lengthwise position relative to the conveyor during the movement of the article through said sharp turn, said stationary guide being operative to effect turning of the article about said article engaging means as a fulcrum to an extent sufficient to cause the articles to be disposed in a transversely extending relationship to said propelling conveyor with their side edges in approximately parallel relation, said article propelling conveyor being thereafter disengaged from the articles to effect said side to side close packing thereof, friction means being provided for engaging the leading faces of the turned articles to thereby adjust the same to the desired fully turned position preceding the delivery of the articles to said close packed section.

ALBERT RAYMOND DE BURGH.

References Cited in the file of this patent

UNITED STATES PATENTS

| Number | Name | Date |
|---|---|---|
| Re. 20,269 | Green | Feb. 16, 1937 |
| 716,932 | Peck | Dec. 30, 1902 |
| 907,116 | Baker | Dec. 22, 1908 |
| 1,028,766 | Montgomery | June 4, 1912 |
| 1,321,303 | Haldeman | Nov. 11, 1919 |
| 1,399,318 | Price | Dec. 6, 1921 |
| 1,642,992 | Fuller | Sept. 20, 1927 |
| 1,727,313 | Pade | Sept. 3, 1929 |
| 1,741,752 | Amory | Dec. 31, 1929 |
| 1,802,546 | Albertoli | Apr. 28, 1931 |
| 1,876,066 | Logan | Sept. 6, 1932 |
| 1,969,276 | Pevear | Aug. 7, 1934 |
| 2,006,870 | Neuman | July 2, 1935 |
| 2,520,253 | Norris | Aug. 29, 1950 |